March 18, 1958     A. D. BRUNDAGE     2,827,105
ELECTRICAL CONTROL SYSTEM FOR A MECHANICAL MOVEMENT
Filed Jan. 14, 1954     2 Sheets-Sheet 1
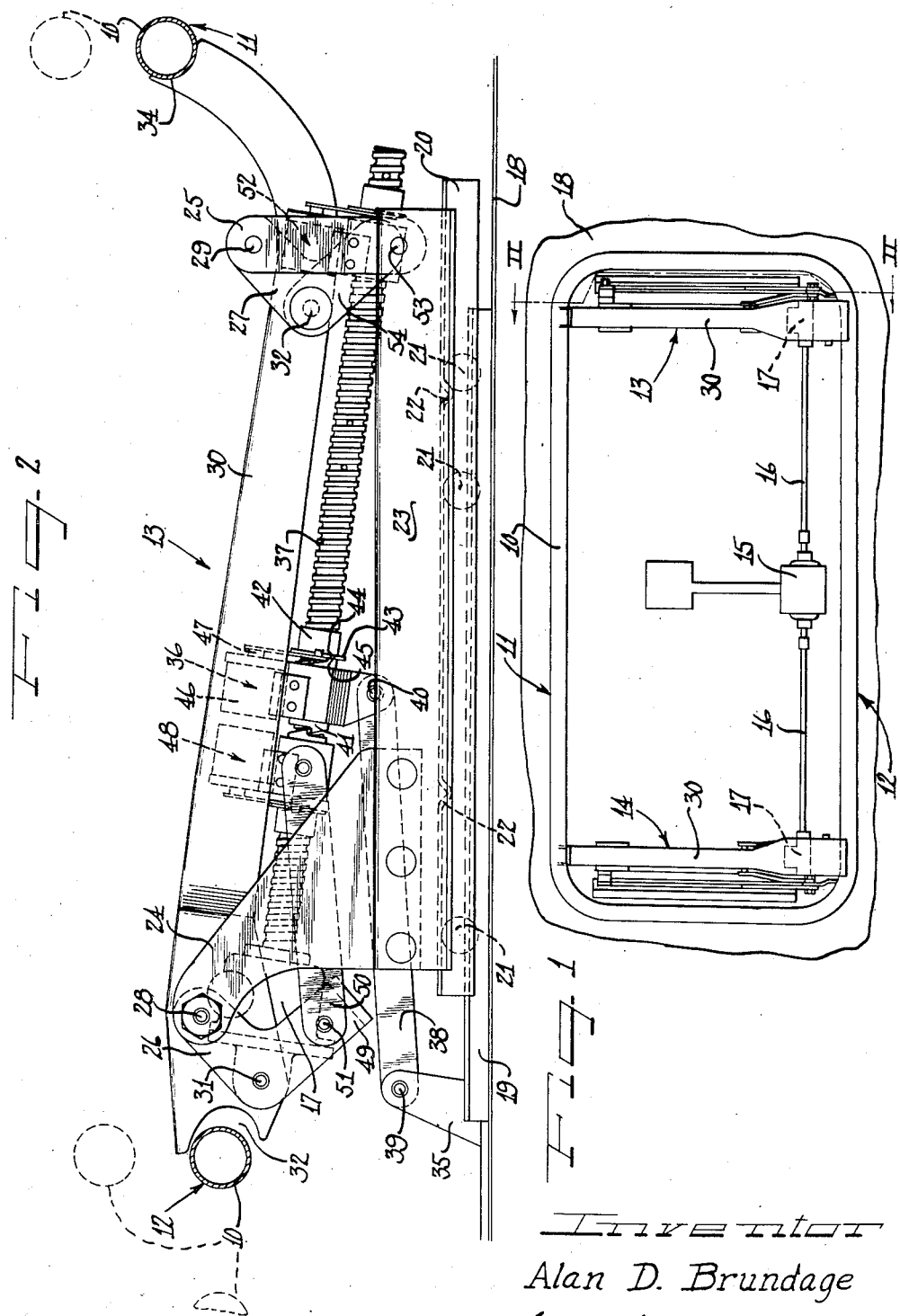
Inventor
Alan D. Brundage

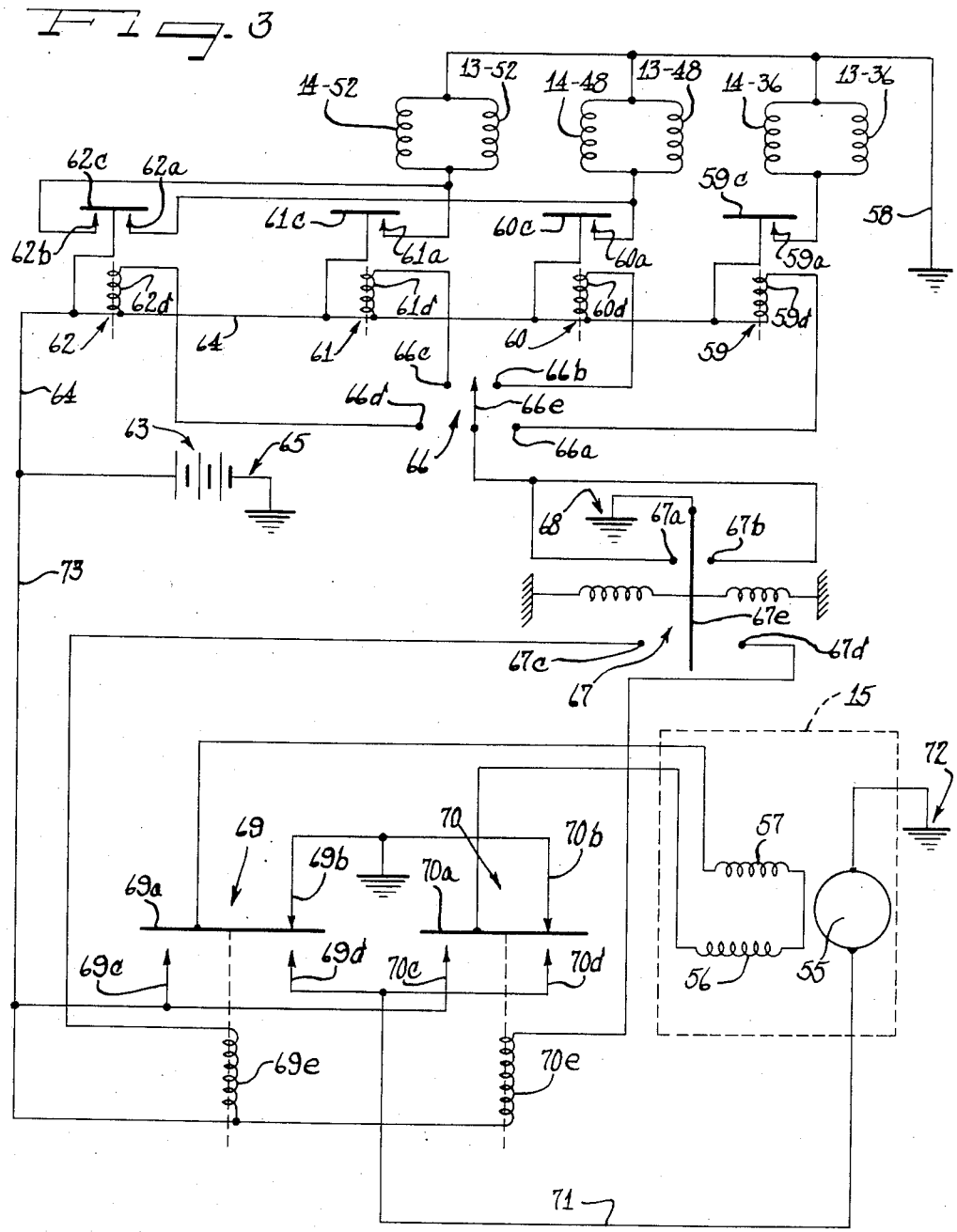

United States Patent Office 2,827,105
Patented Mar. 18, 1958

2,827,105
ELECTRICAL CONTROL SYSTEM FOR A MECHANICAL MOVEMENT

Alan D. Brundage, Birmingham, Mich., assignor to Houdaille Industries Inc., a corporation of Michigan Application January 14, 1954, Serial No. 404,046

3 Claims. (Cl. 155—14)

The present invention relates to an electrical control system, and more particularly relates to an electrical control system for selectively controlling the movement of a mechanical arrangement.

Although the system of the present invention is a system of general applicability and general utility, it will be described herein in detail as an electrical control system for controlling a seat adjusting mechanism, by way of example and not by way of limitation. An appropriate seat adjusting mechanism to be controlled in accordance with the principles of the present invention is the seat adjusting mechanism or mechanical movement described in my copending applications entitled "Seat Adjusting Mechanism," Serial No. 273,741, filed February 27, 1952, and "Seat Adjusting Mechanism," Serial No. 369,423, filed July 21, 1953, respectively. The disclosure of the instant application is a continuation-in-part of each of my aforementioned copending applications.

Seat adjusting mechanisms such as those described in my aforementioned applications provide for universal controlled positioning of the seat such as a vehicle seat or the like. These mechanisms are operable to effect selected platform raising and lowering of the seat as well as forward and rearward positioning of the seat and tilting control to raise or lower the front end of the seat or raise or lower the rear end of the seat selectively.

These controlled movements are provided by linking seat frame supporting brackets to electrically controllable nut assemblies on a screw member to be driven by a motor for clockwise or counter-clockwise rotation selectively. Through control of the direction of rotation of the screw members and through control of the nuts determining relative movement of the nuts on the screws precision control of the position of the seat may be effected.

The nut members, themselves, each include an outer sleeve coaxial with the screw and having circular ball races therein, and inner coaxial sleeves retaining balls in the circular races and in the screw grooves. In addition solenoid operated means are provided for retaining the inner sleeve against rotation with respect to the screw or for permitting rotation of the inner sleeve with respect to the screw selectively. When the inner ball carrying sleeve is retained against rotation with respect to the screw, rotation of the screw will be lost by rolling engagement of the balls within the circular paths or races in the outer sleeve. When the inner sleeve and balls are not so retained in assembly with the screw, however, rotation of the screw will effect translational movement of the nuts while the balls roll in the screw grooves.

By the system of the present invention there is provided means to electrically control several nuts of the mechanical movement of the seat adjusting mechanism selectively through conveniently located remote control switches to effect selective raising and lowering of the seat, selective forward and rearward movement of the seat, and selective tilting of the seat by raising or lowering the front end of the seat or raising or lowering the back of the seat.

The electrical control system of this invention is operative to effect controlled energization of the nut control solenoids and directional energization of the motor driving the screws whereby to selectively control all of the aforementioned desired movements of the seat. Further, the system herein described is operable to provide energization of the motor and the nuts in a single switch movement and to provide selection for desired seat movement in a single switch movement. It is also an important feature of the control system of this invention to provide safe seat adjusting control which is not susceptible to short circuiting or other malfunctions through careless operation.

Accordingly, it is an important object to the present invention to provide an electrical control system for a mechanical movement whereby to selectively control operation of the movement and to selectively energize various electrically responsive components of the mechanical movement.

It is also an important object of the present invention to provide an electrical control system for a seat adjusting mechanism whereby said seat adjusting mechanism will be effective to move a seat selectively forwardly and rearwardly, upwardly and downwardly, and in tilting movement with the front end of the seat moved upwardly and downwardly and with the back of the seat moved upwardly and downwardly selectively.

It is still another important object of the present invention to provide a new and improved electrical control system for a complex mechanical movement which includes a movement selector means and movement energizing means.

Still another object of the present invention is to provide a new and improved electrical control system for a seat adjusting mechanical movement which incorporates solenoid actuated electrical controls and energization control means.

Still another object of the present invention is to provide a mechanical movement having screw means, reversible power drive means for the screw means, a frame and controllable nut elements on the screw linked to the frame to controllably transport a seat forwardly, rearwardly, upwardly, downwardly and in tilting movement, with means to selectively energize the drive means for rotation of the screw in opposite directions and means to selectively control the nut elements to effect selective movement of the frame.

Still other objects, features and advantages of the present invention will become readily apparent from the following detailed description of the principles of the present invention and a preferred embodiment thereof, from the claims, and from the accompanying drawings in which each and every detail shown is fully and completely described as a part of this specification, in which like reference numerals refer to like parts, and in which:

Figure 1 is a top plan view of a seat frame and seat adjusting mechanism;

Figure 2 is a sectional view of the frame and elevational view of the adjusting mechanism as taken substantially along the line II—II of Figure 1; and, Figure 3 is a schematic illustration of an electrical control system to control the seat adjusting mechanism in accordance with the principles of the present invention.

As shown on the drawings:

Mechanical movements, and more particularly, seat adjusting mechanisms such as those described in my herein above identified copending applications, are operable, when properly controlled, to raise, lower, forwardly move, rearwardly move, raise and lower the front end, and raise and lower the back, of a seat such as one which may include a frame 10 herein shown as a substantially rectangularly configurated tubular seat frame with the back portion thereof indicated at 11 and the front portion thereof indicated at 12.

As shown in Figures 1 and 2 the frame 10 is supported by a pair of substantially identical and symmetrically arranged seat adjusting mechanical movements 13 and 14 which are disposed inwardly at opposite sides of the frame extending from front to rear thereof and which are co-operatively coordinated and driven by a motor 15 which is coupled thereto through power take off or linking shafts 16—16 which couple the motor 15 to appropriate gear reduction and transmissions 17—17 in each of the mechanical movements 13 and 14.

Since the mechanical movements 13 and 14 are substantially identical and symmetrically arranged, only one thereof, the mechanical movement and arrangement 13, will be described in detail as the same is illustrated in Figure 2 where it is shown that the frame 10 is supported by the seat adjusting mechanism 13 which is arranged to adjust the position of the seat as described. The entire mechanism and seat frame is supported on such means as the floor pan 18 which has a bearing track 19 secured thereto as a part of each of the adjusting mechanisms 13 and 14. Frictionless roller means such as balls or rollers or the like rest on the fixed tracks 19 and support thereabove a movable track 20 which is arranged for forward and rearward movement on the rollers 21 and on the fixed track 19 for forward and rearward movement. Further, the moving track 20 has stop means 22 fixed thereon or formed as a part thereof acting as forward and rearward movement limiting elements.

The moving track 20 has a carriage plate or the like 23 secured thereto in firm assembly therewith and the carriage plate 23 in turn has upstanding forward and rearward brackets 24 and 25 respectively affixed thereon for forward and rearward movement therewith. These upstanding support brackets 24 and 25 pivotally carry crank type or elbow type levers 26 and 27, respectively, which are pinned thereto as at 28 and 29 at an end of an arm of each of these levers. Substantially centrally of the levers and at the apex of the angle formed by the legs of the levers, each of the levers 26 and 27 is pivotally pinned or the like to a seat frame carriage bracket 30 as at 31 and 32. The frame 10 is carried by recessed end portions 33 and 34 of the frame carriage brackets 30 on each of the seat adjusting mechanisms 13 and 14.

By this arrangement of supporting members the seat frame 10 is supported above the vehicle floor pan 11. Also by this arrangement the seat frame 10 is permitted forward and rearward movement by forwardly and/or rearwardly rolling the movable track 20 on the rolls 21 which roll on the fixed track 19. In addition the frame carriage bracket 30 and the seat frame 10 may be raised by pivoting the levers 26 and 27 about the pivot points 28 and 29 on the support brackets 24 and 25. Raising of the front end of the seat or lowering thereof may be accomplished by pivoting the front lever 26 about the pivot point 28; and the rear end of the seat may be raised or lowered by pivoting the rearward bracket 27 about the pivot 29.

To accomplish forward and rearward movement of the seat frame 10, a fixed pivot bracket 35 is secured to the floor pan 18 and/or the fixed track 19, and is linked to an electrically controllable nut device 36 on a screw 37, by a link 38 which is pivotally connected to the bracket 35 by a pivot pin 39, and which is pivotally connected to the controllable nut device 36 by a pivot pin 40.

Screw 37 is coupled to the motor 15 and drive shaft 16 through the gear box or the like 17 and is thereby controllably driven for clockwise or counter-clockwise movement as desired for forward or rearward movement of the seat frame 10. The nut device 36, which is fully described in great detail in both of my aforementioned copending applications includes an outer sleeve with circular ball races therein and an inner sleeve holding rollers or balls in the races and in the grooves of the screw 37 and is operable in such a manner that when the inner sleeve is fixed for rotation with the screw 37 balls will roll in circular grooves in the outer nut sleeve, while when the sleeve is unlocked from the screw 37, rotation of the screw will cause translation of the nut along the screw since the outer sleeve is fixed against rotation with the screw 37.

To control locking and unlocking of the inner sleeve 41 with the screw 37, an additional sleeve 42 which is slidably keyed to the screw 37, and therefore rotatable therewith, is provided with a rim 43 having a slot 44 therein which is engageable by a tongue 45 on the inner sleeve to fix the sleeves 41 and 42 together when the tongue 45 is in the slot 44. The sleeve 42 is assembled, rotatably, with an electromagnet or nut control motor device 46 having an armature 47 which is normally biased in a direction to lock the lug or tongue 45 in the slot 44. Energization of the motor 46 will move the armature 47 outwardly and thereby disengage the lug 45 from the groove or slot 44.

Thus, by energizing the motor or solenoid 46 and at the same time actuating the motor 15 in a proper direction, the seat will be moved forwardly or rearwardly since the nut 36 is substantially fixed in position through its linkage with the fixed bracket 35.

To move the front end 12 of the seat frame 10 upwardly or downwardly, a similarly electrically controllable nut device 48 is linked to the free arm 49 of the forward lever 26 by a link 50 which is pinned to the nut 48 on the screw 37 and which is pinned to the free arm 49 by the pivot pin 51. Controlled actuation of the nut 48 and the screw 37 will operate to move the nut 48 forwardly or rearwardly along the screw 37 thereby moving the free arm 49 of the link 26 forwardly and pivoting the entire lever 26 about the pivot pin 28 thus raising the frame carriage bracket 30 through the pivot pin 31; or lowering the same through moving the nut 48 rearwardly on the screw 37.

Similarly, to move the rearward end 11 of the seat frame 10, still another similar electrically controllable nut unit 52 is pivotally pinned, as at 53 to the free arm 54 of the rearward lever 27. Again, by proper energization of the nut device 52 and rotation of the screw 37, the seat rearward end 11 may be raised or lowered since to raise the rear end of the seat frame the nut device 52 will move forwardly on the screw 37 thereby moving the free arm 54 forwardly and pivoting the entire lever 27 about the pivot pin 29 thus raising the rearward end of the seat frame bracket 30 through the pivot pin 32. Rearward movement of the nut device 52 on the screw 37 will, of course, lower the pivot pin 32 and thereby lower the seat carriage bracket 30 at the rearward end thereof.

An electrical system embodying the principles of the present invention and operable to control the motor 15 and the several electrically controllable nuts 36, 48 and 52 on each of the mechanisms 13 and 14, is illustrated in Figure 3. In Figure 3, the motor 15 is shown schematically as having an armature 55 and a pair of field windings 56 and 57 which are connected in series. The motor 15, as illustrated schematically, may be any desired preferably shunt type motor of sufficient power.

Also in Figure 3 the electrically controllable nuts are shown schematically by their windings or solenoids 13—36 and 14—36, 13—48 and 14—48, and 13—52 and 14—52 representing the solenoids 36, 48 and 52 for each of the control mechanisms 13 and 14 respectively. In this control system the coils 13—36 and 14—36 are connected in parallel as are the coils 13—48 and 14—48 as well as the coils 13—52 and 14—52, so that energization of the selected solenoids or nut units in each of the seat adjusting mechanisms 13 and 14 will be effected substantially simultaneously for proper synchronized movement of both sides of the seat at the same time.

Each of the three pairs of coils have one side thereof connected to ground as through a lead 58. The other side of each of the pairs of coils are connected to relay contacts 59a, 60a and 61a respectively of relays 59, 60 and 61 respectively. In addition, the same side of the coils 48 and the coils 52 are connected to contacts 62a and 62b respectively, of the relay 62.

Assuming that the contacts 59a, 60a, 61a, 62a and 62b are the stationary contacts of the respective relays, each of the relays is provided with a movable contact 59c, 60c, 61c and 62c, which are normally spaced from the stationary contacts since the relays are normally open, and which are connected to a source of power such as a battery 63, as through a common power lead 64, the other side of the battery being connected to ground as at 65. With this arrangement, when the relay 59 is closed the coils or solenoids or electrically controllable nut units 36 will be energized for moving the seat forwardly or rearwardly depending upon the selected rotation for the motor 15. Similarly, closure of the solenoid 60 will energize the units 48 permitting raising and lowering of the front end 12 of the seat frame; and closure of the relay 61 will permit raising and lowering of the rearward end 11 of the seat frame 10 through energization of the units 52. When the relay 62 is closed, the units 48 and the units 52 will be energized thereby permitting platform lowering of the entire seat since both the front end and the rear end of the seat will be raised or lowered together.

Opening and closing of the several relays 59 through 62 is provided by connecting the coils 59d, 60d, 61d and 62d thereof, respectively, to the power lead 64 on one end of each thereof and connecting the other end of each the coils 59d through 62d to switch terminal posts 66a, 66b, 66c and 66d respectively of a switch 66 having a rotatable switch arm 66e operable to contact each of the switch contact posts individually and selectively. The switch arm 66e is connected to a pair of switch terminal posts or contact posts 67a and 67b of an instantaneous contact self-centering switch 67 having a conductive switch arm 67e which is grounded as at 68 and mechanically biased to a central or neutral position between the contacts 67a and 67b. The contacts 67a and 67b are, however, connected together electrically and to the switch arm 66e of the selector switch 66. Moving the switch arm 66e to conductive contact with the switch contact post 66a, as an example of the utility of this system, and moving the switch arm 67e to conductive contacting relation with the terminal post 67a or 67b will operate to energize the relay 59 thereby closing the contacts 59a and 59c to energize the units 36 from the power source 63.

To energize the motor 15, however, and to control its direction of rotation, and more specifically the direction of rotation of the wound armature 55 thereof, properly connected additional relays 69 and 70 are provided in the system and connected to the motor armature 55 and the motor fields 56 and 57 as well as to the power source 63 and to the self-centering instantaneous contact switch 67. Each of these additional relays 69 and 70 is provided with a movable contact 69a and 70a which are respectively connected to the coils 57 and 56 which are connected in series as herein schematically illustrated. In addition, the movable contacts 69a and 70a are in normally closed contacting relation with grounded contact points 69d and 70 of the relays 69 and 70b respectively.

Each of the relays 69 and 70 is further provided with a pair of normally opened stationary contacts 69c and 69d, and 70c and 70d respectively. The contacts 69d and 70d are connected together and to one side of the wound rotor 55 of the motor 15 through a lead 71, the other side of the motor rotor 55 being connected to ground as at 72. The other contacts 69c and 70c of the respective relays are also connected together but these contacts are connected to the power source 63 as through a lead 73. Thus when the motor relay 70 is closed, the movable contact 70a will contact the substantially stationary contacts 70c and 70d permitting energy flow from the power source 63 through the lead 73, through the contact 70c and the contact 70a, through the winding 56 and thence through the winding 57 to the movable contact 69a of the relay 69 and therethrough to the normally closed grounded contact 69b. At the same time energy will flow from the contact 70c through the movable contact 70a to the stationary contact 70d and thence through the lead 71 to the armature 55 and therethrough to ground 72 to rotate the motor armature 55 in, for example, a clockwise direction. To rotate the motor in the opposite direction, the relay 69 will be closed thereby reversing the direction of flow of power through the windings 56 and 57 so that energy will flow from the power source 63 and through the relay mechanism to the field winding 57 and therefrom through the winding 56 back to the movable contact 70a of the relay 70 and to the grounded normally closed contact 70b.

To effect selected energization of the relays 69 and 70, each is provided with a relay winding 69e and 70e respectively each having one side thereof connected to the power lead 73 and having the other side of each thereof connected to the switch contact points 67c and 67d of the self-centering switch and instantaneous contact switch 67 and on opposite sides of the mechanically biased towards a centered portion switch arm 67e.

Movement of the switch arm 67e in a direction to contact both the contact points 67b and 67d will thus cause energization of the selected nut units depending upon the position of the switch arm 66e of the selector switch 66 and will further energize the motor 15 for clockwise rotation through energization of the motor relay 70. Thus, if the selector switch 66 has its arm 66e connected to the switch contact point 66d both the nut units 48 and both the nut units 52 will be energized thereby raising the seat. Moving the switch arm 67e to the contact points 67a and 67c with the selector switch in the same position will thereby operate to lower the seat.

With this arrangement short circuiting of the system and short circuiting of the power source 63 is substantially entirely prevented and full and complete control for the herein above described universal movement of the seat and seat adjusting mechanism is provided.

It will be understood that modifications and variations may be effected without departing from the scope of the novel concepts of the present invention.

I claim as my invention:

1. An electrical control system for effecting translation of movable components of an automobile seat comprising, a plurality of electric motors each correspondingly adapted respectively for connection to a movable component in operative control of a mechanical movement of the automobile seat for actuating the same, respectively, in either of selected opposite conditions of operation including (1) forwardly and backwardly, (2) upwardly and downwardly, (3) tiltably forward or tiltably back, a reversible electric motor for driving the mechanical movement in either of opposite directions corresponding to the selected opposite conditions of (1), (2) and (3), and two selector controls including a controller in circuit with said plurality of electric motors and separately selectively energizable upon movement from a neutral position to one of three positions corresponding to the conditions of operation of (1), (2) and (3) to connect a corresponding one of said plurality of electric motors with a source of electric power, and further including a self-centering switch means movable in opposite directions from a neutral position for effecting operation of said reversible electric motor in selected direction, said controller and said switch means being jointly manually operable from a neutral position into one or another selected position to connect one or the other of said motors of said plurality of motors to the power source while operating said reversible motor in one or the other direction, thereby to selectively pair the operation of said reversible motor with one or the other of said plurality of motors to move the seat to selected positions.

2. An electric control system for effecting translation of movable components of an automobile seat comprising, a plurality of electric regulator motors each correspondingly adapted respectively for connection to a movable component in operative control of a mechanical movement of the automobile seat for actuating the same, respectively, in one or the other of a selected plurality of operating conditions including (1) forwardly and backwardly, (2) upwardly and downwardly, (3) tiltably forward or tiltably back, a reversible electric drive motor for driving the mechanical movement in either of opposite directions, thereby to selectively control the opposite conditions of operation of (1), (2), (3), and selector controls including relay-operated switch means in circuit with each of said plurality of electric regulator motors and with said reversible drive motor and being separately selectively actuatable to connect a corresponding one of said regulator motors with a source of electric power and to effect operation of said drive motor in selected direction, said selector controls being manually operable from a neutral position into one or the other selected position to selectively pair said drive motor with one or the other of said regulator motors, thereby to select a preferred condition of operation for positioning of the automobile seat.

3. An electric control system for effecting translation of movable components of an automobile seat comprising, a plurality of electric regulator motors each correspondingly adapted for connection to a movable regulator component of a mechanical movement of an automobile seat for actuating the seat in one of three conditions of operation including (1) forwardly and backwardly, (2) upwardly and downwardly, (3) tiltably forward or tiltably back, a reversible electric drive motor for driving the mechanical movement in either of opposite directions, thereby to select one or the other of each of said conditions of operation specified in (1), (2), and (3), and two selector controls including a relay-operated switch controller in circuit with each said regulator motor and being selectively separately actuatable to connect a corresponding one of said regulator motors to a source of electric power and further including a switch means effecting operation of said drive motor in selected direction, said selector controls being jointly manually operable from a neutral position into one or another position to selectively pair operation of said drive motor with said regulator motors, thereby to move said seat to selected positions.

References Cited in the file of this patent

UNITED STATES PATENTS

| | | |
|---|---|---|
| 1,957,785 | Knapp | May 8, 1934 |
| 2,514,314 | Denton | July 4, 1950 |
| 2,605,481 | Burkhardt | Aug. 5, 1952 |
| 2,696,403 | Baugh | Dec. 7, 1954 |

FOREIGN PATENTS

| | | |
|---|---|---|
| 513,262 | Great Britain | Oct. 9, 1939 |